(12) United States Patent
Post (10) Patent No.: US 9,464,670 B2
(45) Date of Patent: Oct. 11, 2016

(54) ELECTROSTATIC STABILIZER FOR A PASSIVE MAGNETIC BEARING SYSTEM

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/928,729

(22) Filed: Oct. 30, 2015

(65) Prior Publication Data

US 2016/0084315 A1    Mar. 24, 2016

Related U.S. Application Data

(62) Division of application No. 13/827,245, filed on Mar. 14, 2013, now Pat. No. 9,197,110.

(51) Int. Cl.
*H02K 7/09* (2006.01)
*F16C 39/00* (2006.01)
*F16C 32/04* (2006.01)

(52) U.S. Cl.
CPC ........... *F16C 39/00* (2013.01); *F16C 32/0404* (2013.01); *F16C 32/0408* (2013.01); *F16C 32/0425* (2013.01); *H02K 7/09* (2013.01)

(58) Field of Classification Search
CPC .. H02K 7/09; F16C 32/0425; F16C 32/0444
USPC ........................................ 310/90.5
See application file for complete search history.

(56) References Cited

U.S. PATENT DOCUMENTS

| 4,562,430 | A | 12/1985 | Robinson | |
|---|---|---|---|---|
| 5,495,221 | A | 2/1996 | Post | |
| 5,847,480 | A | 12/1998 | Post | |
| 6,191,515 | B1 | 2/2001 | Post | |
| 6,515,387 | B1* | 2/2003 | Shinozaki | F16C 32/0451 310/90.5 |
| 6,570,286 | B1 | 5/2003 | Gabrys | |
| 7,052,253 | B2* | 5/2006 | Izraelev | A61M 1/101 310/90.5 |
| 7,876,010 | B2 | 1/2011 | Post | |
| 2004/0174079 | A1 | 9/2004 | Izraelev | |
| 2006/0162452 | A1 | 7/2006 | Moser et al. | |
| 2006/0279149 | A1* | 12/2006 | Asper | H02K 7/09 310/90.5 |
| 2008/0252162 | A1 | 10/2008 | Post | |
| 2011/0248587 | A1* | 10/2011 | Sohn | F16C 39/02 310/90.5 |
| 2011/0291507 | A1 | 12/2011 | Post | |
| 2012/0098371 | A1 | 4/2012 | Pinneo et al. | |
| 2012/0175985 | A1 | 7/2012 | Post | |

OTHER PUBLICATIONS

International Search Report and Written Opinion for PCT/US2014/025417 corresponding to U.S. Appl. No. 13/827,245, 11 pages.

* cited by examiner

*Primary Examiner* — Hanh Nguyen
(74) *Attorney, Agent, or Firm* — John P. Wooldridge (57) ABSTRACT

Electrostatic stabilizers are provided for passive bearing systems composed of annular magnets having a net positive stiffness against radial displacements and that have a negative stiffness for vertical displacements, resulting in a vertical instability. Further embodiments are shown of a radial electrostatic stabilizer geometry (using circuitry similar to that employed in the vertical stabilizer). This version is suitable for stabilizing radial (lateral) displacements of a rotor that is levitated by annular permanent magnets that are stable against vertical displacements but are unstable against radial displacements.

9 Claims, 6 Drawing Sheets

Stiffness at equilibrium position = +176 N/mm.
Inductor losses at equilibrium = 97 Watts = 2.3% per 24 hours

Figure 5: Schematic drawing of circuit connections for radial electrostatic stabilizer.

Figure 6

ELECTROSTATIC STABILIZER FOR A PASSIVE MAGNETIC BEARING SYSTEM

CROSS-REFERENCE TO RELATED APPLICATIONS

This application is a divisional of U.S. patent application Ser. No. 13/827,245 titled "An Electrostatic Stabilizer for a Passive Magnetic Bearing System," filed Mar. 14, 2013, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to magnetic bearings, and more specifically, it relates to techniques for electrostatically stabilizing magnetic bearings.

2. Description of Related Art

Passive magnetic bearing systems such as those described in U.S. Pat. No. 5,495,221, "Dynamically Stable Magnetic Bearing System" consist of two basic elements: (1) Levitating magnets, and (2) a "stabilizer element" such as the stabilizers described in U.S. Pat. No. 5,847,480 "Passive Magnetic Bearing Element with Minimal Losses," incorporated herein by reference. The stabilizers are required as a consequence of Earnshaw's Theorem which proves that no stationary configuration of permanent magnets can magnetically levitate another permanent magnet system and maintain it in static equilibrium. The way around the strictures of Earnshaw's Theorem is to employ dynamic effects to achieve stability. In the cited patent, the stabilizers described employ rotating annular Halbach arrays to induce currents in stationary windings when the rotating system moves away from its intended levitated equilibrium position. These stabilizers thus are based on the use of electromagnetic fields and forces and thus necessarily involve some level of conduction and eddy-current losses. Stabilizers based on the use of electrostatic forces and involving near-zero internal losses are desirable.

SUMMARY OF THE INVENTION

The stabilizers described in this document are based on the use of electrostatic forces and thus involve ear-zero internal losses, Their only source of losses is associated with the electronic circuits required to generate the stabilizing electric fields. With care in the design of these circuits these losses can be made to be very small.

This invention addresses a new type of stabilizer for passive magnetic bearing systems. It is particularly applicable for the bearing systems of flywheel energy-storage modules that consist of a high-speed rotor spinning within an evacuated chamber. The stabilizer is based on the use of electrostatic, forces rather than electromagnetic forces generated by current-carrying conductors. As such it involves virtually zero losses within the vacuum chamber, and also potentially very low losses in the circuitry external to the vacuum chamber. Embodiments of a stabilizer are described that are suitable for passive levitating bearing systems that are designed to be stable against lateral and tilt type displacements, but as dictated by Earnshaw's Theorem are unstable in the axial direction. Its geometry is that upper and lower capacitors formed by is metallic coating on the upper and lower surfaces of a composite rotor with planar ends. Facing these rotating conducting surfaces at the ends of the rotor are two concentric stationary disc-like electrodes. Together with the rotating surface, these conductors form a capacitor, the capacity of which then is determined by the width of the gap between the rotating and stationary part. The mode of operation of the stabilizer takes advantage of the fact that an axial displacement of the rotor from a centered position is accompanied by an increase in the capacity (decrease in the gap) of one of the capacitors accompanied by a decrease in the capacity (increase in the gap) of the condenser at the other end of the rotor. Direct current (dc), radio frequency (rf), or pulsed potentials applied to these capacitors produce attractive forces proportional to the average value of the square of these potentials. Stabilization is achieved by charging the condensers using circuitry that senses the motion and applies increased potentials to the capacitor the gap of which is increasing, and vice-versa. In the attached description of the invention one such circuit is analyzed in detail, and other possible circuit arrangements are described. Further embodiments are shown of a radial electrostatic stabilizer geometry (using circuitry similar to that employed in the vertical stabilizer). This version is suitable for stabilizing radial (lateral) displacements of a rotor that is levitated by annular permanent magnets that are stable against vertical displacements but are unstable against radial displacements.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
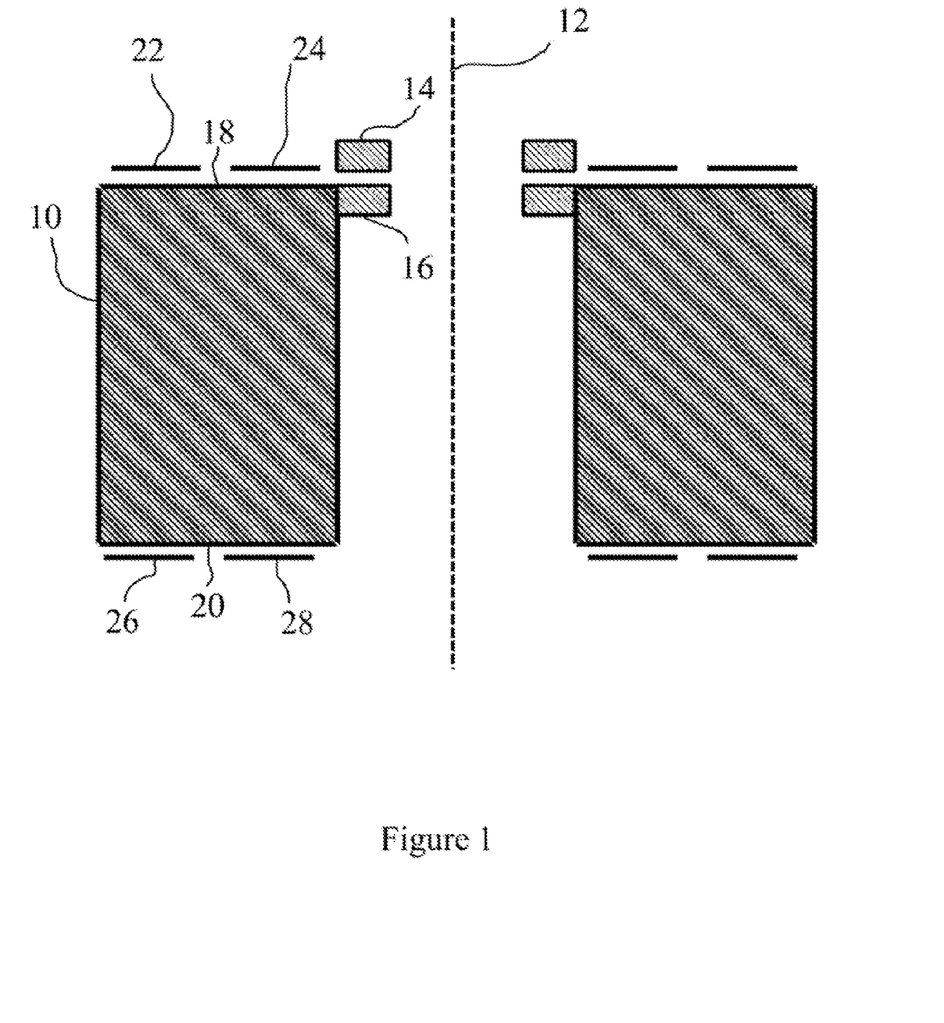
FIG. 1 shows is a schematic drawing of an electrostatic stabilizer, rotor and annular levitation bearings.

The theory of levitation by annular permanent magnets shows that it is possible to design a passive bearing system that stabilizes any pair of the three displacements from equilibrium of an axial symmetric rotating system such as a flywheel rotor. The three displacements alluded to are: axial, radial and tilt. One embodiment of an electrostatic stabilizer described herein is aimed at stabilizing a levitating magnet system the design of which assures stabilization of transverse and tilt-type displacements from equilibrium, but is therefore unstable against axial displacements from the equilibrium position. In one situation described herein, the annular permanent magnets are configured to be stable against transverse and tilt instabilities (if necessary employing gyroscopic effects to achieve tilt stability). With this circumstance in mind FIG. 1 illustrates schematically a cross section of the basic geometry of an embodiment of the present electrostatic stabilizer. Shown is a side view in cross-section of a cylindrical rotor 10, the upper and lower surfaces of which are planar and are perpendicular to the central axis 12. As indicated on the drawing, in addition to the levitating magnets 14 and 16, the rotor to be stabilized carries on its upper surface and its lower surface, a conducting, surface 18 and 20, respectively, in the form, e.g., of a thin metallic sheet bonded to the rotor or a deposited metal film. Close to the upper conducting surface 18 there are located two stationary concentric conducting surfaces 22 and 24 also shown in cross section. Close to the lower surface 20 there are located two stationary concentric conducting surfaces 26 and 28. The total areas of the two upper stationary concentric conducting surfaces is about equal to that of the two lower stationary concentric conducting surfaces. The upper and lower concentric stationary conducting surfaces that face the rotating conducting surface each form an electrical condenser system composed of two condensers in series, the first of which is the condenser formed by the outer one of the stationary conducting surface facing the conducting surface on the rotor end, and the second of which is the condenser formed by the inner stationary concentric surfaces facing the inner region of the conducting surface on the rotor end. Note that when the rotor is located, in its symmetric equilibrium position, (that is, with equal condenser gaps at the top and bottom of the rotor), an upward motion of the rotor will decrease the gap (increase the capacity) of the upper condenser, and vice-versa for the lower condenser.

If an electrical potential is applied to the upper condenser and electrical potentials of the same rms amplitude are applied to the lower condenser, an unstable axial force equilibrium will exist, as follows: an upward displacement of the rotor will result in an increase in the electric field in the upper condenser and vice-versa for the lower one. Thus the attractive force of the upper condenser will increase and vice-versa for the lower condenser, representing a basically unstable situation. Therefore, to achieve a stabilizing effect, it must be arranged that when the gap of either the upper or lower condenser is increased from the equal-gap position, the time-averaged square of the electric field within that condenser is increased, while that on the lower one is decreased, and vice-versa. To achieve stability for the combined passive magnetic bearing/electrostatic stabilizer system, it is then required that the positive stiffness of the stabilizer should exceed the negative axial stiffness of the passive levitating magnet system. The electro-mechanical features of the electrostatic stabilizer that will determine the magnitude of its positive stiffness are the magnitude of the potentials that an applied and the sensitivity of the mechanical/electronic system to axial displacements of the rotor from its centered position.

Given the description above of the operation and the geometry of the electrostatic stabilizer, the remaining item is the nature of the electrical system that produces the electrical potentials that are required to achieve stability. Note that owing to the fact that the force exerted on the stabilizer condensers depends on the square of the applied potentials, it is only the time-average of the square of the potentials that matters in its performance. Thus, dc, rf or pulsed potentials can be used in the driving electronic circuitry. There is therefore a myriad of ways that successful operation of the system could be achieved. We will here describe in detail only one such system, and list others, but without a detailed description of each one's design.

One additional comment on the implementation of the electrostatic stabilizer is the following: in addition to the stabilizer elements themselves, it is desirable to include a means for damping out axial oscillations. Such a damper could be readily implemented in the form of an annular magnet located on the inner surface of the flywheel and facing a closely-spaced copper surface within which eddy currents would be generated that would damp out any axial oscillatory motion of the rotor.

Resonant Circuit Electrostatic Stabilizer

Figure 2:
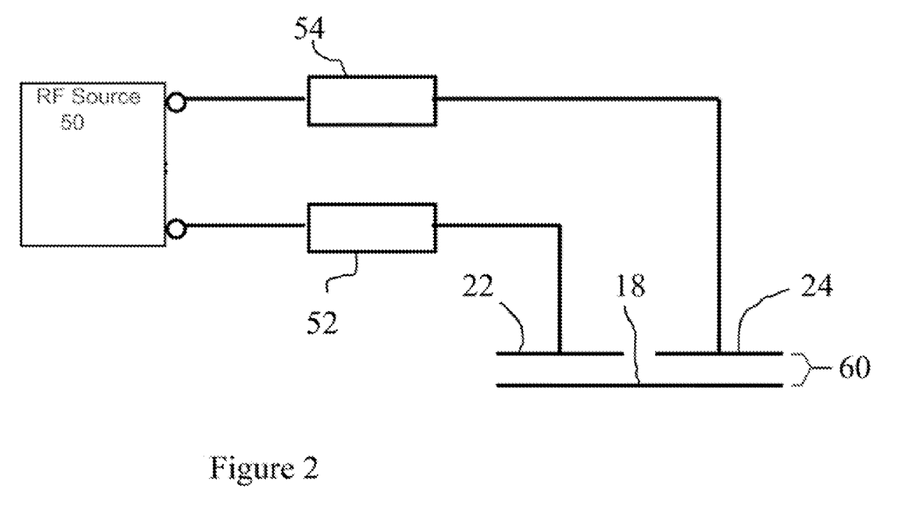
FIG. 2 is a schematic drawing of a circuit of an electrostatic stabilizer.

The concept to be described depends on the resonant build-up of amplitude in circuits made up of a condenser (here the top or bottom condensers described earlier) and inductors, driven by an appropriate source of radio-frequency power. A schematic drawing of an exemplary circuit is shown in FIG. 2 as connected to the upper conducting surfaces 22 and 24 which are spaced apart from upper conducting surface 18 of FIG. 1. An RF source 50 is connected to a first inductor 52 which is connected to surface 22. RF source 50 is also connected to a second inductor 54 which is connected to surface 24. As can be seen from the figure, the upper inductor/capacitor (LC) circuit and the lower LC circuit are driven from a common RF source, operated at frequency f (Hz) (typically hundreds of kilohertz). A similar circuit is used in connection to the lower conducting surfaces 26 and 28. A key point in the design of this circuit is the relative frequencies of the RF source and the resonant frequency of the LC circuit when in its equilibrium position (i.e. equal upper and lower condenser gaps). To achieve a stabilizing force (positive stiffness for axial displacements), the frequency of the radio frequency source is set to be slightly above the LC resonant frequency associated with equal upper and lower gaps. The upper gap is indicated with reference number 60. When a displacement occurs, say an upward displacement of the rotor, the upper gap will decrease, increasing its capacity and thus further lowering the resonant frequency of that circuit below that of the RF source and therefore decreasing the buildup of its amplitude relative to that that would occur at resonance. At the same time, the gap of the lower capacitor will increase, raising its resonant frequency so that it comes closer to that of the RF source, and therefore leading to an increase in the amplitude of the oscillating potentials within it. If the inductors have a high "Q" value (typically 200 or greater, the rise in potential between the condenser plates will be sufficient to greatly exceed the reduction in the electric field between the fixed and rotating electrodes of the stabilizer condenser. As a consequence the value of the squared electric field (which determines the attractive force between the fixed and rotating electrodes will increase. The overall stabilizing force, being the vector sum of the attractive forces of the upper and lower stabilizer condensers, will be twice as large as the force we have just described, since the increase in stabilizing force associated with one set of stabilizer condenser is accompanied by a corresponding decrease in destabilizing force from the other stabilizer condenser.

A computer code has been written that simulates the behavior of the circuits shown in FIG. 2. This code shows that substantial axial stabilization forces (positive stiffness) can be achieved with very modest over losses in the LC circuits of the stabilizer. It also shows a counter-intuitive effect that provides a simple way to augment the stabilizing forces without adding any appreciable power losses. Although the presence of dc potentials alone across the condenser gaps is destabilizing, it was found that the addition of a modest amount of dc biasing potential to the applied RF potentials actually increases the stabilizing effect over that obtained by RF only potentials.

Figure 3:
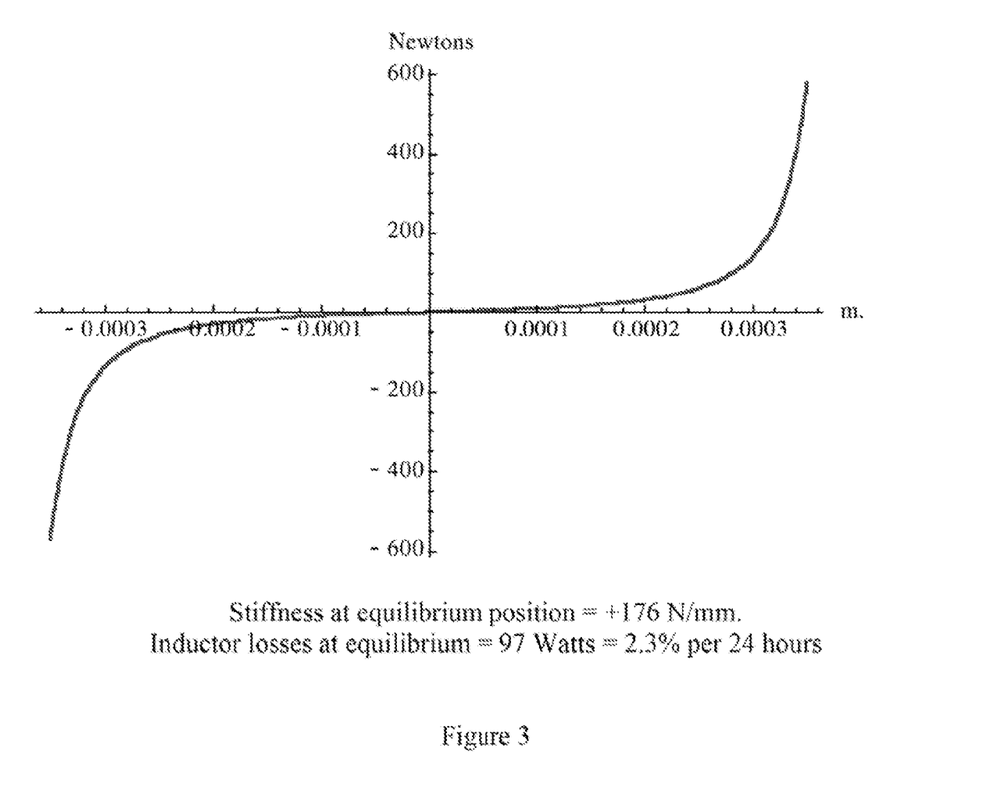
FIG. 3 is a plot of code-calculated force versus displacement for an E-S stabilizer for a 100 kWh flywheel energy storage module.

Turning to the results obtained from the computer code, FIG. 3 shows an example of the restoring force (in Newtons) versus displacement (where m stands for meters) and the positive stiffness that it represents for a case appropriate to a 100 kWh energy storage module. Also listed is the resistive power loss in the inductors of the stabilizer system. Note that for the case shown, the power losses in the equilibrium position amount to only about 2.3 percent of the stored energy per day. Note also that it will be necessary to insure that the levitating force-equilibrium position of the main passive magnetic bearing elements is adjusted to be within a fraction of a millimeter of the equilibrium position (equal upper and lower gaps) of the stabilizer condensers.

Alternative Stabilizer Circuitry

Below are discussed some of the alternative circuit configurations that could be employed with the stabilizer to implement its function effectively with minimal accompanying losses, particularly when employed in a flywheel energy storage module. As mentioned earlier the stabilizing force generated by the stabilizer condensers depends only on the time-averaged square of the applied potentials. This means that in addition to the use of resonance effects and RF potentials as described in the previous section, one can also contemplate the use of pulse trains or pulse-width modulation techniques to accomplish the stabilization, with possible simplification and/or reduction in energy requirements. Note that the large mass of the flywheel implies that its dynamics in response to pulsed forces involves a time-integrating effect that opens up a variety of ways to implement the stabilization. This effect would not be present if we were trying to stabilize the motion of a very light-weight system.

With the foregoing in mind the following describes a possible simple way to implement the stabilization with minimal power losses. To detect a departure from equilibrium, one could use a capacitance bridge employing low power radio frequency to activate the bridge. When the bridge detects an imbalance (and identifies which stabilizer capacitor is increasing its capacity and vice versa), a pulse generator could be activated with a pulse repetition rate that depended upon the magnitude of the imbalance. These pulses would be applied only to the condenser with an increasing gap (decreasing capacity) and, in conjunction with the eddy current damper, would smoothly drive the rotor back to its equilibrium position. As long as the rotor remained within a defined "zone of equilibrium" no pulses would be generated and the associated power losses would diminish accordingly. In this way it should be possible to achieve effective axial stabilization with very small power losses.

Other possible ways to implement the stabilization would to use light beams to determine when the rotor moved a small distance from its equilibrium and then use this information to activate a pulse generator.

The above example illustrates the circumstance that, given the presence of stabilizer capacitors and axial oscillation dampers, there should be many ways to implement the operation of the electrostatic stabilizer system described here.

There has been described a novel stabilizing system based on electrostatic forces and applicable to rotating systems that employ passive magnetic bearings to levitate them. Importantly, the stabilizing effects are achieved with no internal heat dissipation within the vacuum chamber containing the flywheel system, in contrast to stabilizers based on magnetic forces, such as the Halbach array stabilizers. Computer simulations have been made that show that in realistic circumstances these stabilizers should be able to produce positive axial stiffness that is both sufficient to stabilize the levitated system and that achieves that stabilization with acceptably small power requirements.

Thus, embodiments have been shown of an electrostatic stabilizer designed to stabilize a passive bearing system composed of annular magnets having a net positive stiffness against radial displacements. Per Earnshaw's Theorem, such an array must have a negative stiffness (be unstable) for vertical displacements. Further embodiments are now shown of a radial electrostatic stabilizer geometry (using circuitry similar to that employed in the vertical stabilizer). This version is suitable for stabilizing radial (lateral) displacements of a rotor that is levitated by annular permanent magnets that are stable against vertical displacements but are unstable against radial displacements. A simple form of such a levitating array, here for a vertical-axis system, would be the use of an upper and lower pair of repelling annular magnets sized so as to levitate the rotor at a position roughly midway between the upper and lower stationary annular magnets. Such an array is not only stable against vertical displacements but is also stable against tilt displacements.

Figure 4:
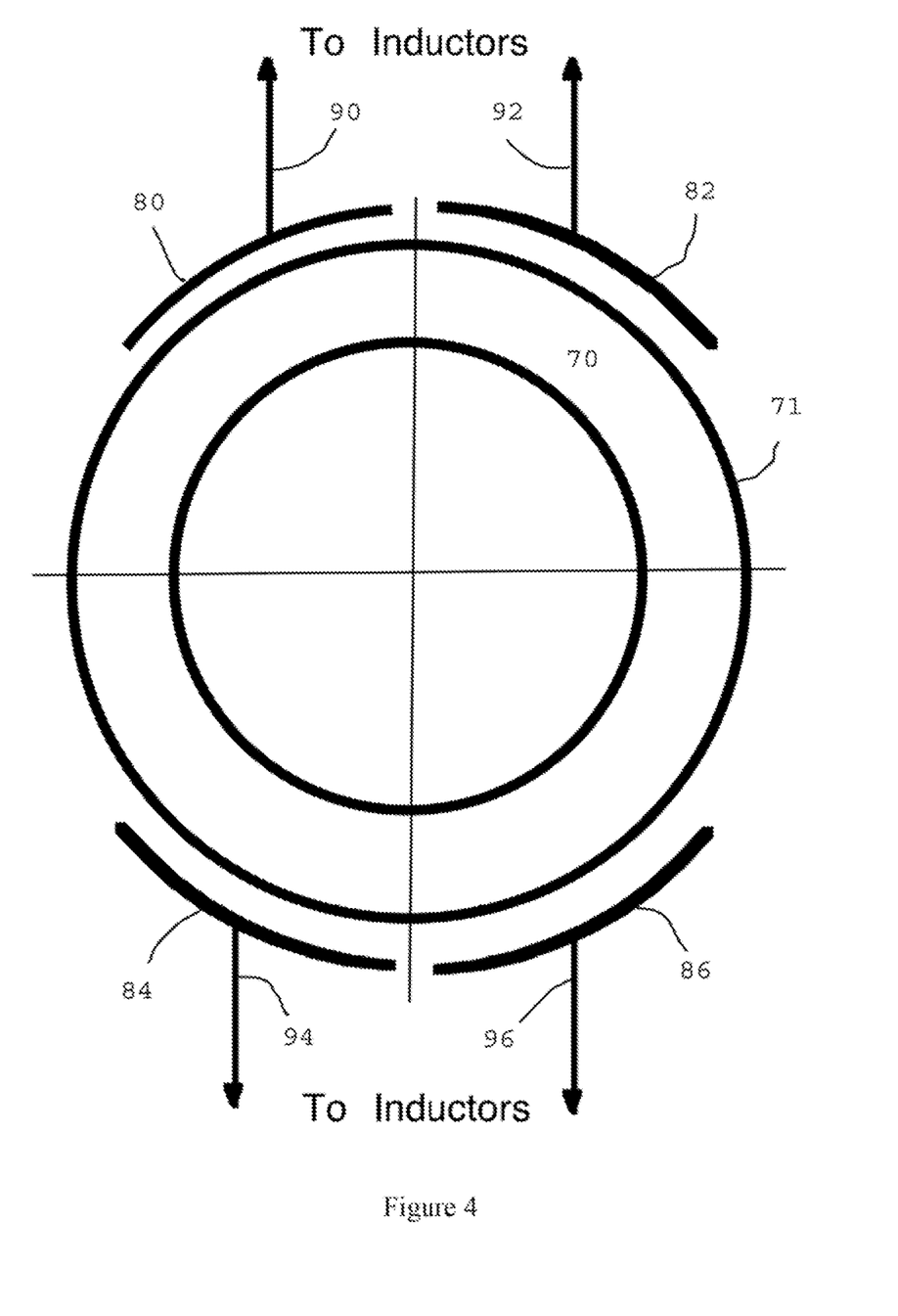
FIG. 4 is a schematic drawing of geometry of one quadrant of radial electrostatic stabilizer.

FIG. 4 shows a top view of an embodiment of the radial stabilizer for stabilizing rotor 70 against radial displacements. To simplify the explanation, the figure shows only two pairs of stationary curved electrodes, with one pair 80, 82 at the top of the page and the other pair 84, 86 at the bottom of the page. The actual embodiment utilizes four pairs of stationary curved electrodes, the azimuthal width of which is 45° (less a small gap to the adjacent electrodes). Thus, the actual embodiment would include another pair of electrodes to the left of the page and another pair to the right of the page. These electrodes face a metallic surface 71 (e.g., evaporated metal or adhesively bonded foil) on the outer vertical surface of the rotor 70. In some embodiments, the rotor comprises a carbon-fiber composite or a glass fiber composite. If the rotor is made of metal, no such foil-type electrode would be required. Electrodes 80, 82, 84 and 86 are connected to leads 90, 92, 94 and 96 respectively. Other possible embodiments of the stator electrodes would include the use of vertically oriented rods or tubes forming curved picket-fence-like arrays, each array covering an azimuth angle slightly less than 45°.

Figure 5:
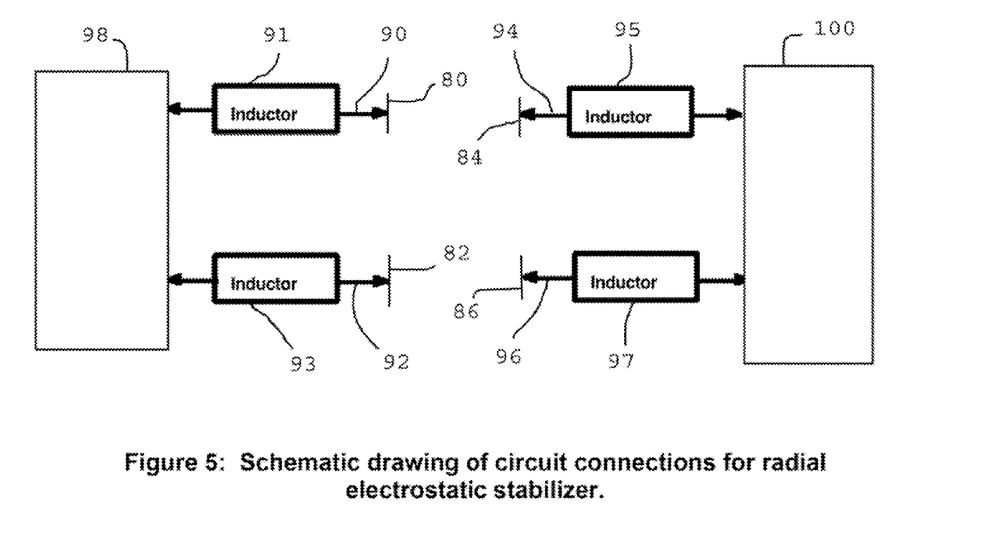
FIG. 5 is a schematic drawing of circuit connections for radial electrostatic stabilizer.

FIG. 5 shows driving, circuits for the two pairs of electrodes of FIG. 4. The curved electrodes of FIG. 4 are shown as vertical lines in FIG. 5. Thus, electrode 80 is connected by lead 90 to inductor 91 and then to RF source 98. Electrode 82 is connected to lead 92 to inductor 93 and then to RF source 98. Electrode 84 is connected to lead 94 to inductor 95 to RF source 100. Electrode 86 is connected to lead 96 to inductor 97 and then to RF source 100. Any transverse displacement of the rotor will result in widening the gap of one of the quadrant pairs while simultaneously narrowing the gap of the pair located 180° from it. Depending on the azimuthal direction of the displacement, all four pairs will experience the widening of one gap and the narrowing of the opposing one to some degree. Note that the circuit involves separate, ungrounded RF sources for each quadrant pair. This requirement is for the purpose of minimizing any cross-coupling between the stabilizer circuits that might be caused by an unequal displacement of one quadrant electrode relative to the second electrode of that quadrant, and/or coupling from other quadrants. A still further reduction in possible cross-coupling effects could be effected by further subdividing each quadrant pair to form a 4-electrode array of alternating polarity, or by separating the conducting coating/foil on the outer surface of the rotor into 2 or 4 bands, in the latter case giving each quadrant stabilizer a single isolated conducting band with which to react.

Figure 6:
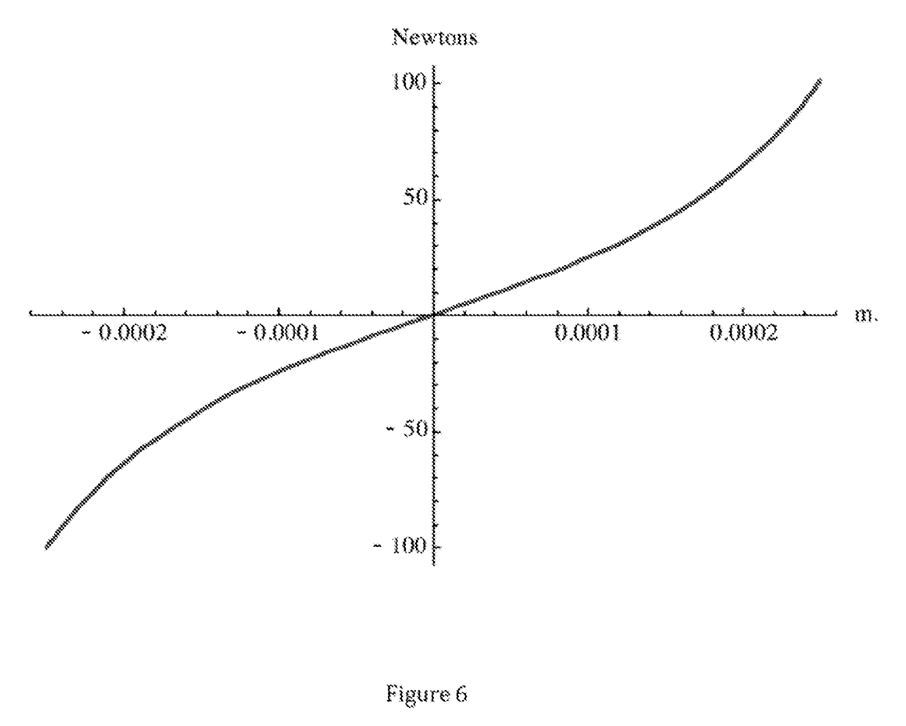
FIG. 6 is a plot of computed restoring force versus displacement from equilibrium for an embodiment of the present electrostatic radial stabilizer.

A computer code has been written that gives the response of one opposing pair of quadrant electrodes for displacements that are directed at the centerline between the electrodes, thus giving an example of the level of positive stiffness that can be achieved in a practical example (here a rotor that is 1.0 meter in diameter and 1.0 meter in length). A plot of the response of this example system versus displacement is shown in FIG. 6. As noted in the figure, the calculated stiffness at zero displacement is +226 Newtons/mm which compares favorably with the stiffness of Halbach array based stabilizers. However, unlike the Halbach array type, this stabilizer has zero power losses within the vacuum chamber, and in this case its calculated external circuit losses (in the inductors) in the equilibrium position are only 60 Watts. It is estimated that the power losses in the rf power source that energizes the stabilizer can be made to be a few percent of the inductor power losses. Since there are two quadrant pairs the total estimated inductor power loss would be 120 Watts. For the example case shown here, for which the calculated energy storage is 60 kWh, the decay time for a power loss of 120 Watts would be 500 hours (about 20 days). This decay time should be suitably long for a bulk storage system that is to be used in a diurnal cycle. Also, with care in the design of the stabilizer even lower losses should be achievable. Note that if the displacement is large enough to reach the regions where the restoring force turns up steeply (owing to approaching the resonant frequency of the L-C circuit) the rf power required would be substantially larger than the equilibrium value of 60 Watts. In practice, saturation of power level in the driver would take care of this problem. Note that in a bulk storage, system where many flywheel modules might be used, a common higher-power rf driver might be employed, with automatic switch-over to a backup system in case of failure. This stratagem might not only save cost, but also further increase the reliability of the storage system.

Thus, an alternate geometry is described that is suited for the stabilization of passive magnetic bearing systems that require stabilization against transverse displacements. Computer code simulations of this system show good positive stiffness and low power losses; where such losses are confined to the external circuitry, with no power being dissipated within the vacuum chamber.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated.

I claim:

1. An apparatus, comprising:
    a right cylindrical rotor configured for rotation about a longitudinal axis, wherein said rotor comprises a metallic outer cylindrical surface;
    a passive magnetic bearing system configured to provide at least axial stabilization of said rotor as said rotor rotates;
    a first plurality of pairs of electrodes, wherein each electrode of each pair of said pairs is spaced from each other electrode and from said metallic outer cylindrical surface, wherein said plurality of pairs of electrodes are spaced around said metallic outer cylindrical surface;
    at least one individual inductor connected to each pair of said first plurality of pairs of electrodes; and
    at least one source of RF voltage connected across each pair of said plurality of pairs of electrodes.

2. The apparatus of claim 1, wherein said first plurality of pairs of electrodes comprises four pairs of stationary curved electrodes, the azimuthal width of which is about 45° less the space between each electrode of each pair of said pairs.

3. The apparatus of claim 1, further comprising:
    a second plurality of pairs of electrodes spaced from said first plurality of pairs of electrodes, wherein each electrode of each pair of said second plurality of pairs is spaced from each other and from said metallic outer cylindrical surface, wherein said second plurality of pairs of electrodes are spaced around said metallic outer cylindrical surface;
    at least one individual inductor connected to each pair of said second plurality of pairs of electrodes; and
    means for providing RF voltage across each pair of said second plurality of pairs of electrodes.

4. A method, comprising:
    providing an apparatus comprising:
    a right cylindrical rotor configured for rotation about a longitudinal axis, wherein said rotor comprises a metallic outer cylindrical surface;
    a passive magnetic bearing system configured to provide at least axial stabilization of said rotor as said rotor rotates;
    a first plurality of pairs of electrodes, wherein each electrode of each pair of said pairs is spaced from each other and from said metallic outer cylindrical surface, wherein said plurality of pairs of electrodes are spaced around said metallic outer cylindrical surface;
    at least one individual inductor connected to each pair of said pairs;
    at least one source of RF voltage connected across each pair of said plurality of pairs of electrodes to form a plurality of series resonant circuits, each comprising a resonant frequency;
    rotating said rotor; and
    providing said RF voltage at a frequency that is higher than said resonant frequency.

5. The method of claim 4, wherein said first plurality of pairs of electrodes comprises four pairs of stationary curved electrodes, the azimuthal width of which is about 45° less the space between each electrode of each pair of said pairs.

6. The method of claim 4, further comprising:
    a second plurality of pairs of electrodes spaced from said first plurality of pairs of electrodes, wherein each electrode of each pair of said second plurality of pairs is spaced from each other and from said metallic outer cylindrical surface, wherein said second plurality of pairs of electrodes are spaced around said metallic outer cylindrical surface;

at least one individual inductor connected to each pair of said second plurality of pairs of electrodes;

means for providing RF voltage across each pair of said second plurality of pairs of electrodes to form a plurality of series resonant circuits, each comprising a second resonant frequency; and providing said RF voltage at a frequency that is higher than said second resonant frequency.

7. An apparatus, comprising:

four pairs of adjacent electrodes fixedly located relative to a longitudinal system axis, wherein said electrodes are arranged in a circle around said system axis, wherein said circle is perpendicular to said system axis, wherein said electrodes are curved with a radius of curvature having its origin at said system axis, wherein each electrode is spaced apart from all of its adjacent electrodes, wherein at least one of the electrodes of each pair is connected to an inductor, wherein said inductor is connected to one output node of at least one source of radio frequency energy, wherein the other electrode of each pair is connected to another output node of the source of radio frequency energy;

a cylindrical rotor having a longitudinal axis of rotation and a metallic cylindrical outer surface, wherein said rotor is movably located within said circle and is able to rotate about said longitudinal system axis, wherein when said rotor is rotating and said longitudinal axis of rotation overlaps and is collinear with said longitudinal system axis, a uniform gap will exist between each of said electrodes and said metallic cylindrical outer surface; and means for stabilizing said cylindrical rotor along said longitudinal system axis.

8. The apparatus of claim 7, wherein a capacitor is formed between each electrode and said metallic cylindrical outer surface such that four series circuits are formed, wherein each series circuit comprises a connection from one said output node to one said inductor to one said capacitor through said outer metallic surface to another one said capacitor to another said output node.

9. The apparatus of claim 8, wherein each inductor comprises a value selected to produce a first resonant frequency within each said series circuit when said uniform gap exists.

* * * * *